June 17, 1930.          C. F. HINDLE          1,764,450
FILM CAMERA APPARATUS
Filed Aug. 28, 1925
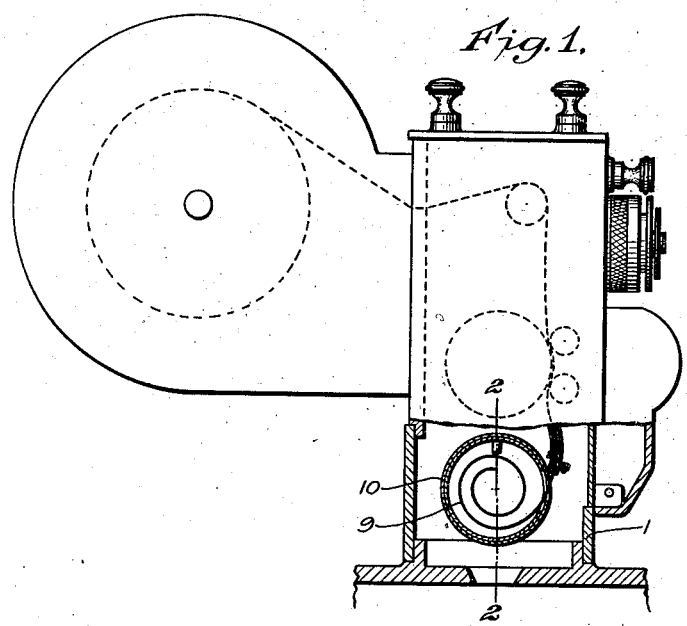
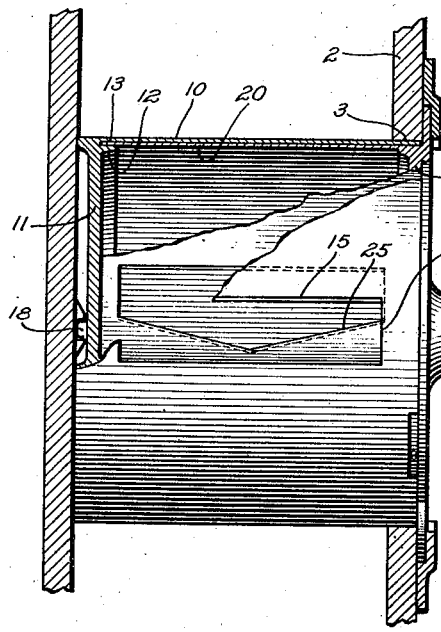
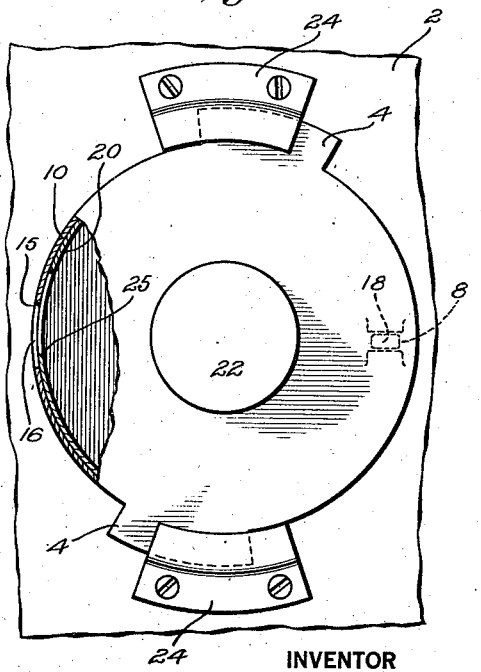
INVENTOR
CHARLES F. HINDLE
BY
W. Jay Ennisson
HIS ATTORNEY Patented June 17, 1930

1,764,450

UNITED STATES PATENT OFFICE

CHARLES F. HINDLE, OF OSSINING, NEW YORK, ASSIGNOR TO CAMBRIDGE INSTRUMENT COMPANY, INC., OF OSSINING-ON-HUDSON, NEW YORK, A CORPORATION OF NEW YORK

FILM-CAMERA APPARATUS

Application filed August 28, 1925. Serial No. 53,064.

My invention relates to film camera apparatus, and more particularly to mechanism for receiving films after exposure and retaining them in light proof containers preparatory to the development thereof.

An object of my invention is, therefore, to provide simple and compact means for containing in convenient form exposed photographic films of varying lengths, which containing means also includes a device for separating the exposed portion of a film from the unused sensitized portion.

Another object of my improvement is to provide a container for exposed portions of a photographic film with a light proof door device which when closing to exclude the light from the interior thereof, also severs from the film strip the portion within the container.

A still further object of my invention is to provide a light proof receptacle for exposed photographic films which causes the incoming film strip to coil itself as it enters therein; and other purposes of my improvement will appear as the specification proceeds.

Generically described, my invention comprises a container having two complemental members preferably cylindrical in form, and having registrable openings through the peripheral sides thereof for receiving within the receptacle a continuous strip of exposed photographic film wherein the film coils itself in conformance with the curvature of the interior of the receptacle.

The cylindrical form of my container, furthermore, lends itself to the employment of a relatively simple and inexpensive construction of shutter or light proof closure, which may also be adaped conveniently to supply cutting means for separating the included exposed portion of a film strip from the roll.

Thus, as will presently be seen more in detail, the cylinder, cylindrical in form for receiving the film, and having through its side a rectangular opening with a cutting edge by means of a similarly curved shell provided also with a cutting edge that rotatably operates therein, supplies the means to effect a shearing cut when the inner shell is suitably rotated within the outer casing.

The device as shown in the accompanying drawings is illustrated in connection with a camera apparatus, incompletely shown in the drawings, which after the exposure thereof feeds the film into the receptacle to which my improvement relates. My invention is especially designed, however, to operate in connection with cameras of the general type illustrated in my co-pending application, Serial No. 712,794, filed May 13, 1924, where a container receives a film strip from the camera apparatus proper, with means as shown in the drawings for guiding the film into the receptacle, the closure in my improved device being operated to cut off the film by the same operation that shuts out the light therefrom before removal from the camera apparatus.

In the accompanying drawings illustrative of a preferred embodiment of my improved photographic film receptacle.

Figure 1 is a side elevation thereof as incorporated with a type of camera apparatus partially shown in dotted lines.

Fig. 2 is an enlarged partial sectional view taken upon line 2—2 of Fig. 1; and

Fig. 3 is a side elevation of the receptacle in operable position within the camera, a portion thereof broken away to show the closure and cutting means in detail.

Having reference to the drawings, the numeral 1 represents the frame of a type of camera apparatus in connection with which my receptacle is designed to operate, and 2 is an enclosing box having a rounded recess 3 into which an embodiment of my improved receptacle 10 is inserted for receiving the film 9. Ears 24 for retaining the receptacle in place are oppositely attached to the wall 2 of the enclosing box at either side of the recess 3 and are adapted to engage the locking wings 4, the ears 24 being attached by ordinary machine screws to the wall 2.

The receptacle of my improvement comprises a cylindrical outer casing 10 and an inner shell 20 rotatably housed normally within the outer casing. The shell members 10, 20 are each closed at one end and open at the other, the casing 10 having the head 11, the shell 20 having similarly been provided with the closed end or head 21. The curved or cylindrical portions of the casing and its included shell are preferably made of thin sheet metal and the respective heads may be formed up integral with the cylindrical side portions. In the preferred form illustrated in the drawings, however, the heads 11 and 21 are shown formed separately with the rounded body portions, which may be secured thereon by any convenient way, such as riveting or brazing.

Upon the inner face of the head 11 is formed the concentric annular rib 12 of slightly reduced diameter, whose peripheral edge forms with the portion of the inner face 13 of the casing 10 a grooved guideway for the curved open end of the shell 20 when inserted to the full depth of the casing.

Longitudinally of the casing 10 an opening 16 is formed therein of a length sufficient freely to receive whatever width of film strip 9 is intended to be used therewith, which opening is substantially equal to the operable length of the cylinder.

The peripheral opening 16 in the casing is preferably rectangular in form, thereby supplying parallel sides, one of which is suitably bevelled or otherwise adapted to form by its edge a cutting blade 15 that is employed with suitably provided cutting edge 25 of the shell 20 in severing the strip of film 9 that has passed through the opening and into the receptacle.

The shell 20, because of its incomplete cylindrical formation, normally possesses, or may be given, a tendency to expand against the inner wall of the casing 10 so that the edges 25 thereof are held by virtue of the aforesaid elastic action of the shell always in shearing relationship with the oppositely disposed cutting edge 15 of the outer cylinder.

The cutting edges 25 of the shell last above referred to are of a divergent or V-shaped contour and by reason of the diagonally disposed edges form with the longitudinally disposed edge 15 of the oppositely disposed edge of the rectangular opening of the outer casing, an easy shearing action in cutting off the strip of film that has been fed into the container through the opening 16.

When normally in place for receiving the photographic film the receptacle 10 in the present application of the apparatus has its opening 16 at the one side for the reason that the film is fed down from the camera shown herewith to the side of the receptacle in the manner shown in Fig. 1. To maintain the parts in such operable position a vertically slotted lug 18 has been provided upon the outer face of the head 11 of the cylinder 10, having parallel inner surfaces suitably provided for receiving the locking lug 18 which is accordingly placed at or near the bottom of the head 11, suitably disposed relatively to the location of the opening 16, the retaining slot 8 having been so placed as to engage the lug 18 in its lowest position as described.

The retaining ears 24 suitably supported upon the frame at either side of the recess opening 3 have their inner faces curved to coincide with the curvature of the recess 3, to permit the passage of the receptacle therebetween and, being attached to the flat face of the frame 1, have their inner edges raised above the surface of the frame sufficiently to receive the wings 4, which extend laterally and radially from the head 21 that supports the shell 20, and to hold them securely against the frame of the camera.

The location of the locking devices comprising the ears 24 and the corresponding radial extensions or wings 4, and the operable shape and size of those respective members, are determined by the position and circumferential length of the thin metal portion of the curved shell 20, which it has been seen falls short of the complete cylindrical construction of the casing 10 which contains the rotatable shell.

Thus, the lug 18 when the outer case 10 to which it is attached is inserted in the recess 3, properly locates that member to receive the film. The shell 20 may then be inserted and rotated within the case 10 by means of the knob 22, and when secured therein by means of the wings 4 being carried under the ear pieces 24, in such locked position the open portion of its curved shell will be in register with the opening 16 of the case 10, as shown best in Fig. 3, in which positions of the locking members the cutting edges 15 of the case and 25 of the shell will stand separated each from the other and constituting respective sides of the opening through which the film may be fed into the receptacle; and similarly on removal, by twisting the knob 22 in the opposite direction the knife edges 15 and 25 come together to sever the film strip 5 and close the opening 16. Hence, the combined operable length of the locking ear 24 and wing 4 on each side must be sufficient to hold the parts in place until the cutting edge 25 shall have passed beyond the oppositely disposed cutting member 15, the circumferential length of the curved portion being sufficient to cover the opening 16.

Thus in the single operation of carrying the wings 4 from under the ears 24, the above mentioned conditions having been met, the exposed film is separated from the strip, and simultaneously the receptacle is rendered light proof and therefore in all respects ready for withdrawal from the camera recess 3 and is thus in condition to be transferred to the dark room for development.

The two casings 10, 20 as has been seen together form a substantially continuous cylindrical interior and will by virtue of such curved interior cause a film strip being fed into it to coil around itself practically until the container is filled to its capacity.

I claim:

1. In a camera, in which sensitized material may be exposed, and having an opening through which the sensitized material may be fed out of the camera, a cylindrical receptacle comprising an outer cylindrical casing and an inner cylindrical casing housed in the outer casing, the casings being each open at one end and closed at the other end, the closed ends being disposed at opposite ends of the receptacle, the casings being provided in their sides with longitudinally disposed registrable openings the walls of which constitute cutting blades, one of the casings having a locking member for locking the said one casing against rotation when the opening of the said one casing is alined with the camera opening, the other casing being rotatable with respect to the said one casing, to aline the opening of the said other casing with the camera opening, whereby the receptacle may be mounted adjacent to the camera with the registrable openings alined with the camera opening to permit the sensitized material to be fed, after exposure in the camera, into the receptacle through the registrable openings, the said other casing having means for locking the receptacle against detachment from its mounting when the registrable openings are alined with the camera opening and means for rotating the said other casing relatively to the said one casing to cause the cutting blades to move relatively past each other to sever the material and to close the registrable openings to render the receptacle light proof and to render the locking means ineffective so as to permit the inner and outer casings to become detached as a light-proof-unit receptacle with the severed material therein.

2. In a camera, in which sensitized material may be exposed, and having an opening through which the sensitized material may be fed out of the camera, a cylindrical receptacle comprising an outer casing and an inner casing housed in the outer casing, the casings being each open at one end and closed at the other end, the closed ends being disposed at opposite ends of the receptacle, the casings being provided in their sides with longitudinally disposed registrable openings the walls of which constitute cutting blades, means for mounting the receptacle adjacent to the camera with the registrable openings alined with the camera opening to permit the sensitized material to be fed, after exposure in the camera, into the receptacle through the registrable openings, and means for relatively rotating the inner casing in the outer casing to cause the cutting blades to move relatively past each other to sever the material and to close the registrable openings to render the receptacle light proof, the inner and outer casings being detachable as a light-proof-unit receptacle with the severed material therein.

3. In a camera, in which sensitized material may be exposed, and having an opening through which the sensitized material may be fed out of the camera, a cylindrical receptacle comprising an outer casing and an inner casing housed in the outer casing, the casings being each open at one end and closed at the other end, the closed ends being disposed at opposite ends of the receptacle, the closed end of one of the casings having a curved guideway for receiving the open end of the other casing, the casings being provided in their sides with longitudinally disposed registrable openings the walls of which constitute cutting blades, means for mounting the receptacle adjacent to the camera with the registrable openings alined with the camera opening to permit the sensitized material to be fed, after exposure in the camera, into the receptacle through the registrable openings, and means for relatively rotating the inner casing in the outer casing to cause the cutting blades to move relatively past each other to sever the material and to close the registrable openings to render the receptacle light proof, the said open end of the said other casing being guided in the curved guideway during the said relative rotation, the inner and outer casings being detachable as a light-proof-unit receptacle with the severed material therein.

4. In a camera, in which sensitized material may be exposed, and having an opening through which the sensitized material may be fed out of the camera, a cylindrical receptacle comprising an outer casing and an iner casing housed in the outer casing, the casings being each open at one end and closed at the other end, the closed ends being disposed at opposite ends of the receptacle, the casings being provided in their sides with longitudinally disposed registrable openings the walls of which constitute cutting blades, one of the casings having a locking member for locking the said one casing against rotation when the opening of the said one casing is alined with the camera opening, the other casing being rotatable with respect to the said one casing, to aline the opening of the said other casing with the camera opening, whereby the receptacle may be mounted adjacent to the camera with the registrable openings alined with the camera opening to permit the sensitized material to be fed, after exposure in the camera, into the receptacle through the registrable openings, and means for rotating the said other casing relatively to the said one casing to cause the cutting blades to move relatively past each other to sever the material and to close the registrable openings to render the receptacle light proof, the inner and outer casings being detachable as a light-proof-unit receptacle with the severed material therein.

5. In a camera, in which sensitized material may be exposed, and having an opening through which the sensitized material may be fed out of the camera, a cylindrical receptacle comprising an outer casing and an inner casing housed in the outer casing, the casings being each open at one end and closed at the other end, the closed ends being disposed at opposite ends of the receptacle, the casings being provided in their sides with longitudinally disposed registrable openings the walls of which constitute cutting blades, one of the casings having a locking member for locking the said one casing against rotation when the opening of the said one casing is alined with the camera opening, the other casing being rotatable with respect to the said one casing, to aline the opening of the said other casing with the camera opening, whereby the receptacle may be mounted adjacent to the camera with the registrable openings alined with the camera opening to permit the sensitized material to be fed, after exposure in the camera, into the receptacle through the registrable openings, the said other casing and the receptacle mounting having cooperating ears and wings adapted to engage to lock the receptacle against detachment from the mounting when the registrable openings are alined with the camera opening, and means for rotating the said other casing relatively to the said one casing to cause the cutting blades to move relatively past each other to sever the material and to close the registrable openings to render the receptacle light proof, and to disengage the wings from the ears so as to permit the inner and outer casings to become detached as a light-proof-unit receptacle with the severed material therein.

In testimony whereof I have hereunto set my hand.

CHARLES F. HINDLE.